(12) United States Patent
Filias et al.

(10) Patent No.: US 8,364,330 B2
(45) Date of Patent: Jan. 29, 2013

(54) METHOD OF ASSISTING PILOTING AT LOW ALTITUDE

(75) Inventors: Francois-Xavier Filias, Pelissanne (FR); Marianne Gillet, Vitrolles (FR)

(73) Assignee: Eurocopter, Marignane Cedex (FR)

( * ) Notice: Subject to any disclaimer, the term of this patent is extended or adjusted under 35 U.S.C. 154(b) by 331 days.

(21) Appl. No.: 12/821,748

(22) Filed: Jun. 23, 2010

(65) Prior Publication Data

US 2010/0332123 A1    Dec. 30, 2010

(30) Foreign Application Priority Data

Jun. 26, 2009 (FR) .................................. 09 03119

(51) Int. Cl.
*G06F 7/70* (2006.01)
(52) U.S. Cl. .......................................................... 701/14
(58) Field of Classification Search .................... 701/14, 701/301, 467
See application file for complete search history.

(56) References Cited

U.S. PATENT DOCUMENTS

| | | | |
|---|---|---|---|
| 5,488,563 A | 1/1996 | Chazelle | |
| 5,638,282 A | 6/1997 | Chazelle | |
| 5,677,842 A | 10/1997 | Denoize | |
| 5,706,011 A | 1/1998 | Huss et al. | |
| 6,317,690 B1 | 11/2001 | Gia | |
| 6,421,603 B1 | 7/2002 | Pratt | |
| 6,622,066 B2 | 9/2003 | Ishihara | |
| 7,321,812 B2 | 1/2008 | Silberman et al. | |
| 7,783,394 B2 * | 8/2010 | Artini | 701/4 |
| 2001/0023390 A1 * | 9/2001 | Gia | 701/301 |
| 2005/0258979 A1 * | 11/2005 | Artini et al. | 340/970 |
| 2005/0273223 A1 * | 12/2005 | Artini et al. | 701/9 |
| 2006/0031004 A1 | 2/2006 | Lundberg | |

FOREIGN PATENT DOCUMENTS

| | | |
|---|---|---|
| EP | 0597760 A1 | 5/1994 |
| EP | 0775953 A1 | 5/1997 |
| EP | 0707194 B1 | 5/1999 |
| EP | 1598718 A1 | 11/2005 |
| FR | 1374954 | 9/1960 |
| FR | 2658636 A1 | 8/1991 |
| FR | 2712251 A1 | 5/1995 |
| FR | 2898972 A1 | 9/2007 |
| FR | 2916053 A1 | 11/2008 |
| JP | 6024393 A | 2/1994 |
| JP | 8050700 A | 2/1996 |
| JP | 2001033271 A | 2/2001 |
| JP | 2002298161 A | 10/2002 |

(Continued)

OTHER PUBLICATIONS

Search Report and Written Opinion; Application No. FR 0903119; dated May 3, 2010.

*Primary Examiner* — James Trammell
*Assistant Examiner* — Michael D Lang
(74) *Attorney, Agent, or Firm* — Brooks Kushman P.C.

(57) ABSTRACT

A method of assisting the piloting of an aircraft (60) at low altitude over terrain (S), in which method, during a first stage, a framework (10) is constructed from at least one main segment (40) and during a second stage a setpoint flight path (50) is constructed. More precisely, during the first stage, said main segment (40) is subdivided automatically into a plurality of secondary segments (41, 42, 43), each of said secondary segments (41) being situated at the same setpoint height above the highest point of the underlying terrain, with two adjacent secondary segments (41) being in alignment or connected together by a bar (44) that extends vertically in a vertical section.

14 Claims, 4 Drawing Sheets

FOREIGN PATENT DOCUMENTS

| | | |
|---|---|---|
| JP | 2003510675 A | 3/2003 |
| JP | 2003130674 A | 5/2003 |
| JP | 2004523411 A | 8/2004 |
| WO | 95/19609 A1 | 7/1995 |
| WO | 2004/095394 A2 | 11/2004 |
| WO | 2006/079718 A1 | 8/2006 |

* cited by examiner

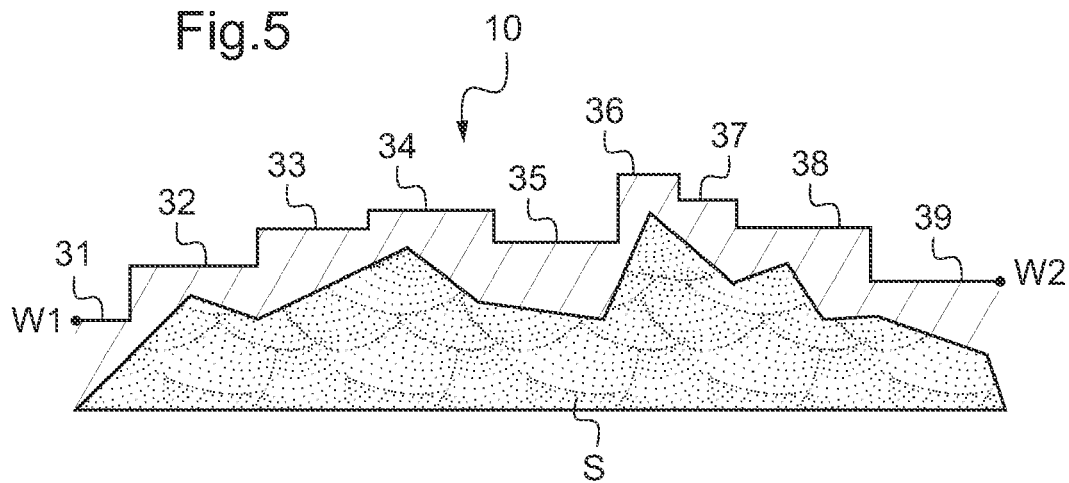
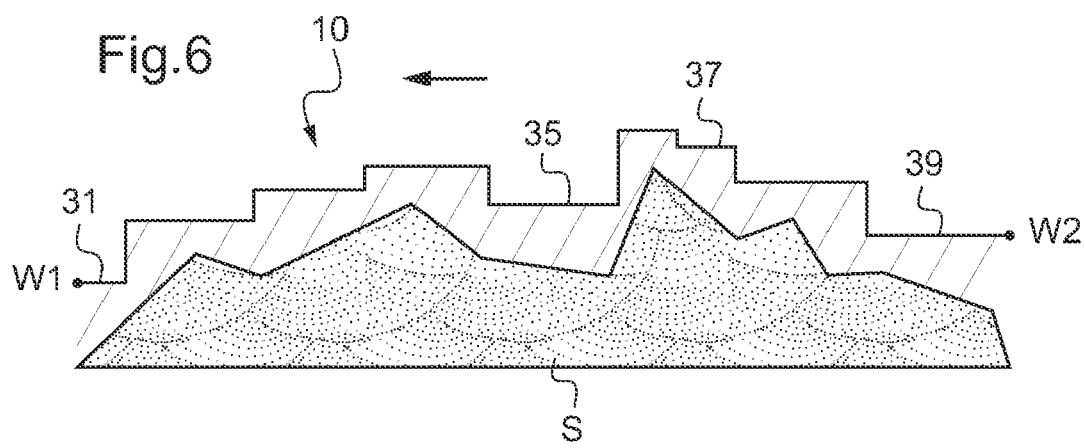
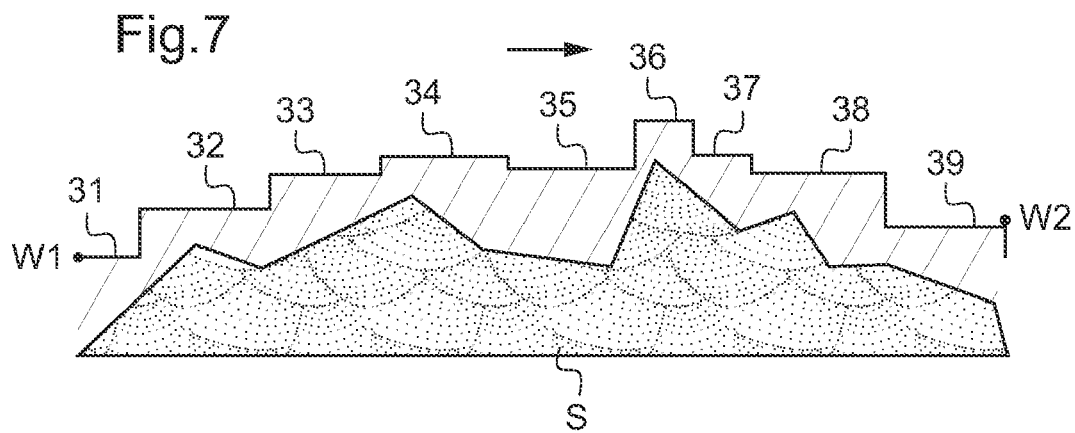

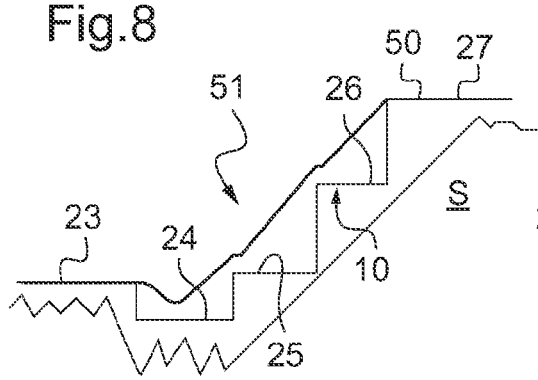
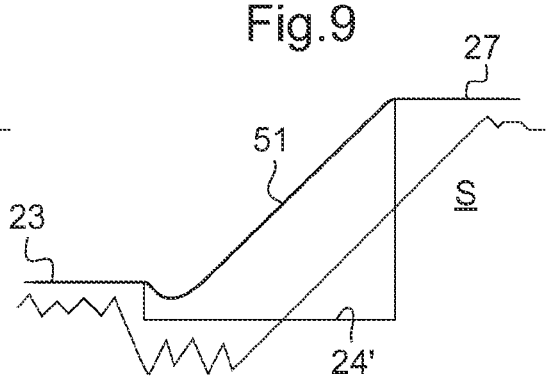
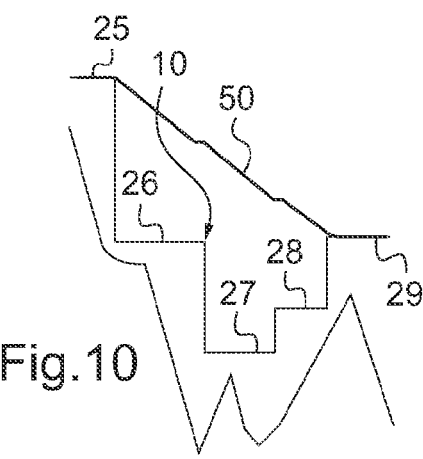
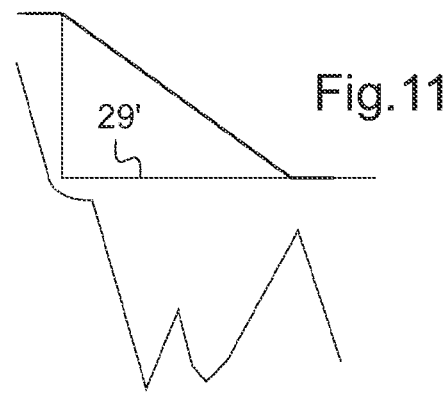
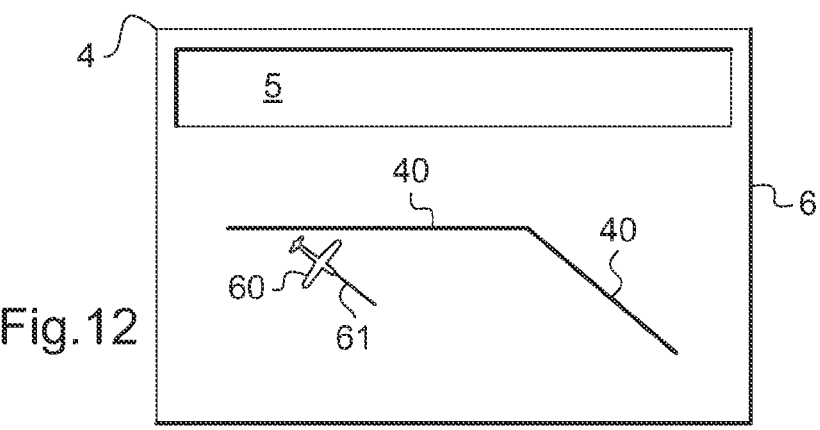
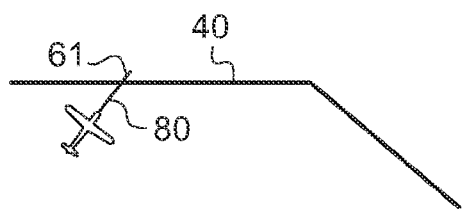

METHOD OF ASSISTING PILOTING AT LOW ALTITUDE

CROSS-REFERENCE TO RELATED APPLICATION

This application claims the benefit of FR 09 03119 dated Jun. 26, 2009, the disclosure of which is incorporated herein by reference.

FIELD OF THE INVENTION

The present invention relates to a method of assisting piloting at low altitude, enabling the crew of an aircraft to prepare and follow a safe flight plan, outside instrument-flying infrastructures.

The invention thus lies in the field of navigation and flight management systems for an aircraft, and more particularly a helicopter, which field usually covers the functions of positioning, preparing a flight plan, and generating a flight path.

It should be observed that the term "flight plan" designates a theoretical route to be followed by an aircraft in order to go from a first waypoint to a second waypoint, and then possibly from the second waypoint to a third waypoint, and so on.

In addition, the term "flight path" is used to designate the path to be followed by the aircraft, said path being as close as possible to the theoretical route and advantageously taking account of the capacities of the aircraft.

Flying at low altitude as close as possible to obstacles is extremely difficult and dangerous without the help of a dedicated device suitable for avoiding any collision between the aircraft and an obstacle. Such low altitude flight is made even more difficult when visibility is poor, or even zero, insofar as the pilot can no longer make use of external visible clues.

Unfortunately, it is sometimes essential to fly at low altitude, in particular on life-saving missions, e.g. as performed by a helicopter. Altitude has a harmful impact on bleeding, for example, so it is appropriate to fly as close as possible to the ground in order to avoid harming the physical integrity of an accident victim.

BACKGROUND OF THE INVENTION

Document U.S. Pat. No. 6,317,690 describes a method of generating a flight plan using a digital model for the elevation of the terrain that is being overflown, known as digital terrain evaluation data (DTED®) by the person skilled in the art.

Such digital models are "closed", since a pilot cannot modify the content thereof.

Various types of digital model are available as a function of their accuracy. Thus, a level 1 DTED® model uses a mesh with an accuracy of three seconds of arc, i.e. about 100 meters, whereas a level 2 DTED® model uses accuracy of one second of arc, i.e. about 30 meters.

Nevertheless, that document U.S. Pat. No. 6,317,690 does not describe flight path generation in detail.

Document FR 2 712 251 provides for calculating a hypothetical curve associated with a theoretical optimum path for steering an obstacle, and in the field ahead of the aircraft it makes provision for:
  determining all obstacles situated in a search zone;
  comparing the tops of said obstacles with the hypothetical curve;
  defining as dangerous any obstacles having tops that are higher than said hypothetical curve; and
  communicating information about the tops of said dangerous obstacles.

According to that document, the hypothetical curve thus follows the terrain with a dynamic vector that is adapted to the aircraft.

Nevertheless, that method implies using telemetry sensors in order to pick up obstacles and their tops. That gives rise to effectiveness that fluctuates as a function of the sensors used.

The same applies to the device set out in document FR 1 374 954.

According to document WO 2004/095394, a pilot defines a plurality of waypoints in order to generate horizontal main segments.

Each main segment is then positioned vertically at a given height above the terrain, obtained with the help of an elevation DTED® digital model.

That first stage serves to obtain a hypothetical framework having a plurality of levels.

Thus, in a horizontal projection on the ground, the theoretical route to be followed is a broken line. Furthermore, in a vertical section, the theoretical route comprises mutually parallel horizontal segments, each horizontal segment presenting a level with a "staircase" profile.

During a second stage, computer means determine a flight path that is compatible with the capacities of the aircraft tending to follow said framework as closely as possible.

That method is well suited to conventional flights, but it is not suitable for tracking terrain at low altitude. In order to reach a result that is satisfactory, it would be necessary for the pilot to determine a very large number of waypoints, and that would appear to be incompatible with a rescue mission undertaken urgently.

Document FR 2 658 636 suggests determining an avoidance path by minimizing a performance index that is a function of the altitude of the aircraft, of a lateral offset between the position of the aircraft and a reference itinerary, and of a weighting coefficient.

Document US 2006/0031004 provides for establishing a path to minimize the exposure of an aircraft to a threat. Thus, a path is generated from a digital elevation model, and then a survival rate is determined based on exposure to a threat along that path.

Thereafter, an optimized path is generated from the path that gives the best survival rate.

Document US 2006/0031004 thus applies to tactical flights and not to rescue missions. The paths that are generated do not appear to be optimized for such rescue missions, in which rescued passengers ought not to be subjected to too many varied and sudden movements.

The same applies to Document U.S. Pat. No. 5,706,011.

Document EP 0 775 953 discloses a method during which a pilot determines waypoints, with computer means generating a path having varying slopes. Such a path is effective when visual flight rules apply, but does not appear to be suitable for instrument flying.

Finally, document U.S. Pat. No. 7,321,812 presents a method of transforming a terrain profile into a profile for tracking the terrain in flight as a function of performance parameters of a vehicle.

SUMMARY OF THE INVENTION

An object of the present invention is thus to propose a method of assisting piloting at low altitude that makes it possible to generate a path that can be tolerated in particular by people who are physically weakened.

It should be observed that document EP 1 598 718 presents a method of displaying a safe altitude that an aircraft may follow in an emergency. Although very advantageous and effective, that method does not seek to establish a path to be followed by an aircraft in order to satisfy precise constraints.

According to the invention, in a method of assisting piloting an aircraft at low altitude over a terrain, during a first stage, a framework is constructed from at least one main segment of given corridor width that extends in a horizontal projection over a model of said terrain between successive first and second waypoints determined by an operator, and then during a second stage, a setpoint flight path is constructed with the help of the framework. The setpoint flight path is generated so as to rest on the framework, in particular so as to make it possible to provide optimized level flight.

The method is remarkable in particular in that during the first stage, the main segment is automatically subdivided into a plurality of secondary segments of given corridor width so that the framework follows the terrain as closely as possible, the secondary segments going from a first secondary segment starting from the first waypoint to a last secondary segment terminating at the second waypoint, each secondary segment being arranged at a setpoint height above the highest point of the terrain that it overlies, said setpoint height is identical for all of the secondary segments of a main segment, with any two adjacent secondary segments that are not in alignment being connected together by a vertical bar in a vertical section of said terrain and containing said main segment.

It should be understood that the term "secondary segment" is used for convenience, and represents the trace of a secondary surface in a vertical plane, said secondary surface being defined by the length of the secondary segment and by the width of the corridor. The high point of the terrain situated under each secondary segment, or in fact under each secondary surface, is possibly obtained with the help of a digital model of terrain.

Furthermore, the corridor width of the secondary segments may, for example, be data that is provided by an operator as a function of safety requirements. It can be understood that a surface defined by a secondary segment and a corridor width is centered on said secondary segment.

It should be observed that throughout the description, the term "altitude" of an element designates the vertical distance between said element and a given reference level, which level may possibly be set by an operator, and is advantageously sea level in a given frame of reference.

Conversely, the term "height" of an element is used to designate the vertical distance between said element and the ground, e.g. a mountain.

Finally, the highest point of a terrain corresponds to the point of that terrain that has the highest altitude. Thus, the term "highest point of the terrain that it overlies" relates to the point of the underlying terrain that has the highest altitude.

Thus, the state of the art, and more particularly document WO 2004/095394, provides for connecting two waypoints together by a single main segment that is at a considerable height above the terrain so as to guarantee that the aircraft does not come into contact with an obstacle.

In contrast, the invention makes provision for generating a framework by automatically partitioning each main segment into a multitude of secondary segments. All of the secondary segments are thus at the same setpoint height above at least one point of the underlying terrain, but they are not necessarily at the same altitude.

During a second stage, a setpoint flight path is determined by a "sheet laying" method for example, or by relying on existing 3D guidance algorithms such as those implemented in flight management systems (FMS) in operation.

The pilot or the autopilot system then controls the aircraft so that it follows the setpoint flight path as generated and defined in three-dimensional space. Under such circumstances, the aircraft does not fly at an altitude that is equal to the sum of the highest altitude point on the terrain plus a safety height, but rather it tracks the terrain at successive levels.

The method of the invention thus serves to reduce the altitude at which the rotorcraft flies, while nevertheless flying in level stages in order to avoid harming an accident victim.

Flying in this way at successive levels at a setpoint height above the ground also enables the pilot to be physiologically comfortable. The pilot can thus follow a flight path that provides stages of level flight during which the work load on the pilot is reduced.

This method may include one or more of the following characteristics.

Thus, for a setpoint secondary length to be reached by the secondary segments that has been determined, for example by an operator and in arbitrary manner, and for Euclidean division of a main length of the main segment by the setpoint secondary length giving a quotient and a remainder:

if the remainder is zero, then during the first stage, the main segment is subdivided into a number of secondary segments all having a real secondary length equal to the setpoint secondary length, the number of secondary segments being equal to the quotient; and if the remainder is not equal to zero, then during the first stage, the main segment is subdivided firstly into a number of secondary segments all having the setpoint secondary length, that number being equal to the quotient minus one, and secondly into a lengthened secondary segment having a lengthened secondary length equal to the sum of the setpoint secondary length plus the remainder, the lengthened secondary segment being the first secondary segment of the main segment.

Thus, a framework is obtained of staircase shape comprising a succession of levels, each level being represented by a determined secondary segment, this being done advantageously automatically by computer means.

In a first implementation, the setpoint secondary length is determined by an operator.

In a second implementation, the operator defines both a setpoint duration for traveling along a secondary segment and a setpoint indicated air speed. Thereafter, the setpoint secondary length is determined by multiplying the setpoint duration by a setpoint ground speed as calculated from the setpoint indicated air speed and the existing wind.

It is also recalled that the indicated air speed is the indicated air speed shown to the crew.

Furthermore, ground speed is deduced from the indicated air speed and the existing wind by conventional methods that are described in the literature. In order to determine the setpoint ground speed, it is appropriate to use said methods while replacing indicated air speed with the setpoint indicated air speed.

Advantageously, during the first stage, for an operator specifying a given number of secondary segments of secondary length that is to be minimized, the altitude of each secondary segment is determined relative to a given reference level, such as sea level in a given frame of reference, and:

the secondary length of the given number of secondary segments is minimized to a given minimum length starting from the secondary segment having the greatest altitude and continuing in order of decreasing altitude in order to obtain the given number of minimized secondary segments;

each minimized secondary segment of altitude greater than the secondary segments adjacent thereto is centered so as to obtain a minimized secondary segment that is centered about the highest point of the terrain underlying the centered and minimized secondary segment; and for the main segment including a first portion going from the first secondary segment to a centered and minimized secondary segment, for a second portion going from a centered and minimized secondary segment to the last secondary segment, and eventually if any for at least one intermediate portion between two centered and minimized secondary segments, the following steps are performed in each of the portions:

starting from each centered and minimized secondary segment, the adjacent secondary segments are moved longitudinally to reconstitute the framework; and then on reaching the secondary segments of the portion that has the lowest altitude, the lowest-altitude secondary segment is modified by lengthening or shortening its secondary length so as to obtain a modified secondary segment suitable for being connected to at least one adjacent secondary segment by a vertical bar.

An operator may seek to minimize flying time at one or more high altitudes. Thus, the invention makes it possible to shorten the secondary segments that pass via high points.

Thereafter, an operator provides a given number of high points to be minimized as a function of the terrain, e.g. two high points. The high points in question are then minimized, specifically the two highest secondary segments in this example, so as to obtain minimized secondary segments of secondary lengths that are equal to a minimized length.

In the first implementation, the minimized length is given by an operator directly in the form of a length. In contrast, in the second implementation, the operator gives a minimum flying duration, which is transformed automatically into a minimized length by being multiplied by the ground speed as calculated from the setpoint indicated air speed and the existing wind.

Secondary segments adjacent to segments that have been centered and minimized are subsequently moved so as to conserve the continuity of the framework, until reaching the secondary segment that is positioned at the lowest altitude relative to the given reference level, said secondary segment positioned at the lowest altitude being modified.

Furthermore, in order to avoid impacting transition zones between two main segments, the secondary length of the first and last secondary segments is never minimized.

In addition, during an intermediate stage between the first stage and the second stage, the framework is advantageously optimized by minimizing the value of the following expression:

$$E = \int_{ti}^{tf} tdcp(x)\,dx - \int_{ti}^{tf} Zt(x)\,dx$$

where:

x is the curvilinear abscissa of the setpoint flight path;

tdcp(x) represents the function describing the framework determined during the first stage;

Zt(x) represents the height of the overflown terrain;

ti represents the beginning of the first secondary segment of the main segment in question; and tf represents the end of the last secondary segment of the main segment in question.

Specifically, the area between the secondary segments and the overflown terrain is then minimized.

Thereafter, for said framework being moved longitudinally through a given stepsize and in iterative manner over a given distance, with the value of said expression E being recalculated on each step, the value of said expression E is minimized during the second stage by using the framework that gave rise to a minimum value for said expression.

The initial framework is then moved in a first direction through a first step equal to the quantization stepsize of the digital model of the terrain that is being used, e.g. of the DTED® level 2 type, so as to obtain a temporary framework for which the expression E is recalculated.

This is repeated iteratively until the total movement amounts to a given distance, e.g. equal to half the length of the shortest secondary segment.

Similarly, the initial framework is moved in a second direction opposite to the first through a step equal to the quantization stepsize so as to obtain a temporary framework for which the expression E is recalculated. This is repeated iteratively until reaching a total movement equal to a given distance, e.g. equal to half the length of the shortest secondary segment.

During the second stage, the framework that gave rise to the smallest value for said expression E is then used.

It will be understood that while modifying the framework produced during the first stage or during the intermediate stage, i.e. either following minimization of at least one secondary segment or else following optimization of the expression E described above, if a movement, a shortening, or an increase of a secondary segment gives rise to a reduction or to an increase in the height between the secondary segment and the terrain, then said secondary segment is moved vertically to said setpoint height above the highest point of the terrain that it overlies.

Advantageously, for each secondary segment being required to have a secondary length lying between a given minimum secondary length and a given maximum secondary length, then while modifying the framework produced during the first stage or during an intermediate stage, i.e. either following minimization of at least one secondary segment or else following optimization of the expression E described above:

if the secondary length of a secondary segment becomes greater than or equal to said given maximum secondary length, then said secondary segment in question is subdivided into two secondary segments of identical size; and if the secondary length of a secondary segment becomes shorter than or equal to said minimum secondary length, then said secondary segment in question is eliminated and the adjacent secondary segment having the lower altitude is lengthened to compensate.

For example, the given minimum secondary length is settable by an operator and the given maximum secondary length is equal to the sum of the setpoint length plus the minimum secondary length.

It should be observed that if a movement, a reduction, or a lengthening of a secondary segment gives rise to a reduction or an increase in the height between the secondary segment and the ground, then said secondary segment is moved vertically to said setpoint height above the highest point of the underlying terrain.

Furthermore, during the second stage, the above-mentioned "sheet laying" method is implemented. Thus, a climb rate and a descent rate are advantageously defined and then the setpoint flight path is constructed on the basis of the highest secondary segment and moving down progressively towards the lowest altitude secondary segments, with the setpoint flight path being plane along the secondary segments it encounters and having slopes that are determined by the climb and descent rates in the other zones.

A highest secondary segment is a secondary segment at an altitude that is higher than the altitudes of the two secondary segments adjacent thereto, the first and last secondary segments of a main segment being highest secondary segments if their altitudes are greater than the altitudes of the single secondary segments of said main segment to which they are connected.

Under such circumstances, a lowest secondary segment is a secondary segment at an altitude that is lower than the altitude of at least one adjacent secondary segment to which it is connected in the main segment.

The image is that of laying or draping a sheet over the framework, with the sheet being required to follow slopes that are determined by the climb and descent rates as defined by an operator.

Optionally, if during the second stage the constructed setpoint flight path does not make it possible to pass level over at least one secondary segment and gives rise to a continuously rising curve, then the framework is modified by fusing said at least one secondary segment with the secondary segment preceding said at least one secondary segment in order to construct a fused secondary segment which is given the altitude of said preceding secondary segment.

The upward flight path is consequently smooth.

Similarly, if during the second stage the constructed setpoint flight path does not make it possible to pass level over at least one secondary segment and gives rise to a continuously descending curve, then the framework is modified by fusing said at least one secondary segment with the secondary segment following said at least one secondary segment in order to construct a fused secondary segment which is given the altitude of said following secondary segment.

Advantageously, the fused secondary segment is constructed if the at least one secondary segment generating a continuously rising curve does not include the first secondary segment of the main segment in question or if the at least one secondary segment generating a continuously descending curve does not include the last secondary segment of the main segment in question.

Optionally, the transformation of the framework performed during the second stage is used in discrete manner solely for constructing the setpoint flight path. More precisely, two distinct frameworks are used, i.e. a transformed framework during the second stage for establishing the setpoint flight path and a framework for displaying on a screen, which framework does not take account of the transformation of the second stage.

Finally, for display means presenting the main segment and presenting the aircraft extended by a rectilinear segment, if the aircraft is no longer following a main segment, when the rectilinear segment crosses a main segment once more, and on instruction from an operator, a return main segment is created that is subdivided automatically into a plurality of return secondary segments so that a return framework follows the terrain as closely as possible and gives rise to a return flight path.

In addition, for a setpoint secondary length to be reached by the secondary segments that have been determined, said main segment is automatically subdivided into a plurality of secondary segments if the length of said main segment is greater than twice said setpoint secondary length.

BRIEF DESCRIPTION OF THE DRAWINGS

The invention and its advantages appear in greater detail in the context of the following description of implementations given by way of illustration and with reference to the accompanying figures, in which:

FIGS. 5, 6, and 7 are diagrams explaining the optimization of a framework;

FIGS. 8 and 9 are diagrams explaining the smoothing of a climbing flight path;

FIGS. 10 and 11 are diagrams explaining the smoothing of a descending flight path; and FIGS. 12 and 13 are diagrams explaining how a return framework is created.

DETAILED DESCRIPTION OF THE PREFERRED EMBODIMENT

Elements that are present in more than one of the figures are given the same references in each of them.

Figure 1:
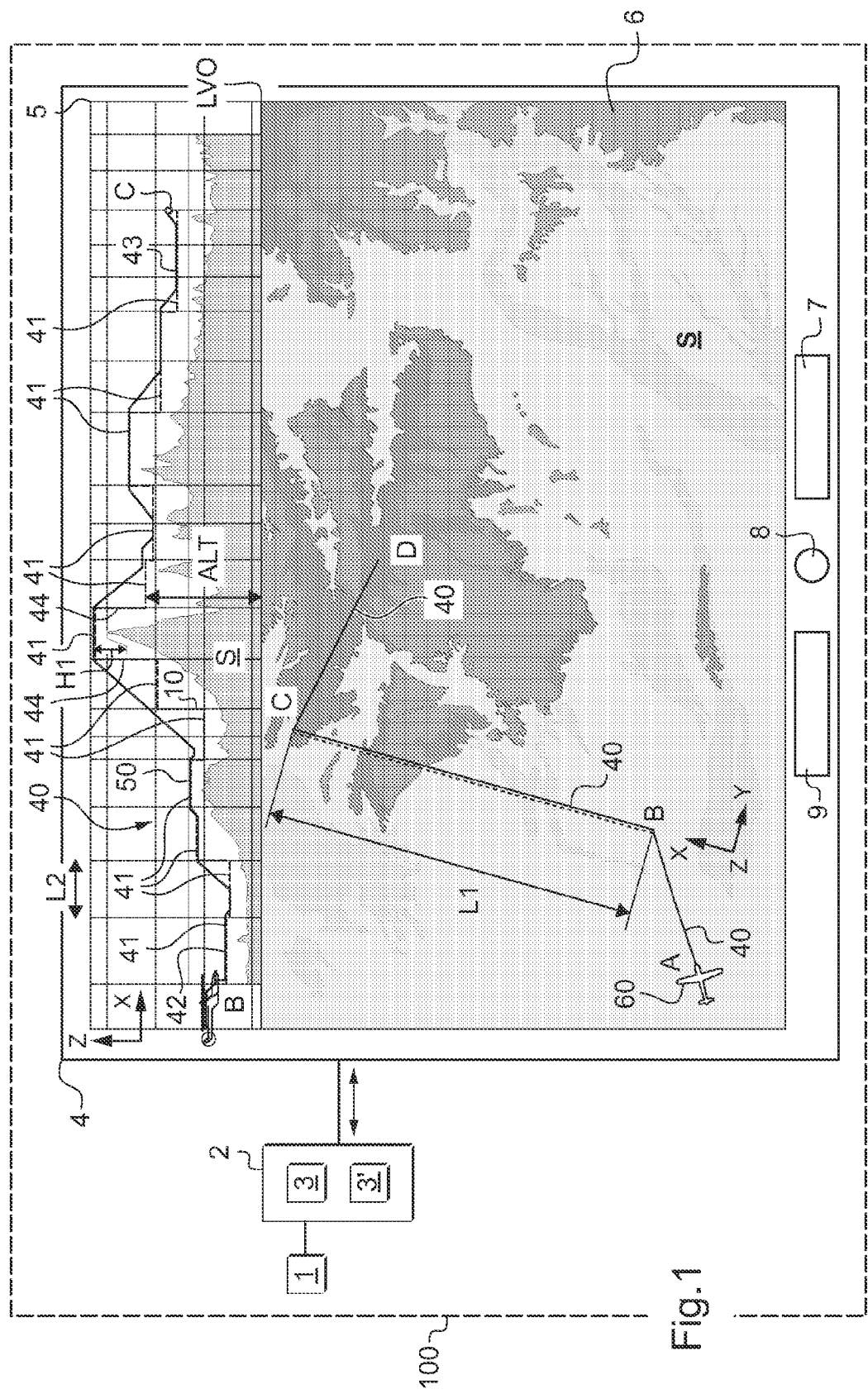
FIG. 1 is a diagram of a device suitable for implementing the invention.

FIG. 1 shows three mutually orthogonal directions X, Y, and Z.

The first direction X is said to be longitudinal and the second direction Y is said to be transverse.

Finally, the third direction Z is said to be in elevation.

FIG. 1 shows a device suitable for implementing the method of the invention.

The device comprises computer means 2 provided with a processor 3, e.g. a microprocessor, and a memory 3'.

The computer means 2 communicate with a database 1 containing a digital terrain model, such as a level 2 DTED® model, so as to cause display means 4 to display a horizontal projection 6 of said terrain S onto a plane (X, Y) representing a plan view of the terrain, together with a vertical section 5 of the terrain S taken along the route to be followed in a plane (X, Y).

The database 1, the computer means 2, and the display means 4 may form part of a single unit 100 arranged in the cockpit of an aircraft.

It should be observed that the display means 4 also include a dialog screen 7, input means 9, and selector means 8.

Using the input means 9, such as a keyboard, a mouse moving a pointer, or any other equivalent means, in an initial stage, an operator in flight or on the ground inputs a plurality of waypoints A, B, C, D via which the aircraft is to pass, e.g. in order to go to the site of an accident.

In parallel, the computer 3 of the computer means 2, in association with the display means 4, determines main segments 40 between pairs of successive waypoints. Thus, first, second, and third main segments 40 are created respectively between waypoints A and B, waypoints B and C, and waypoints C and D.

Furthermore, each main segment is given a common corridor width that can be set in advance and that is contained in the memory 3' of the computer means 2. This corridor width is set by the operator or by the manufacturer in order to take account of the uncertainty of the positioning means of the aircraft.

By connecting together and then subdividing the main segments, a framework 10 is constructed for a route that serves during a second stage to construct a setpoint flight path that the pilot is to follow.

To fly at low altitude over a main segment, the computer 2 selects said main segment. Selection may be performed with the help of a pointer that is moved using the selector means 8.

It should be observed that the selected main segment on which the operator is working, specifically the second main segment interconnecting waypoints B and C in this example, is the segment shown in the vertical section 5.

Under such circumstances, the computer 3 of the computer means 2 automatically subdivides the selected main segment 40 into a plurality of secondary segments 41 that appear on the display means 4.

Thus, it is possible to project onto the horizontal projection 6 both a main segment 40 in the form of a continuous line of blue color, for example, and also secondary segments 41 in the form of discontinuous lines, e.g. of red color. Furthermore, the secondary segments 41 are caused to appear in the form of horizontal lines in the vertical section 5 of the terrain.

In addition, the computer 3 of the computer means 2 positions the secondary segments vertically so as to avoid any collision with the terrain S.

Thus, once an operator has set a setpoint height H1 that is stored in the memory 3', the computer 3 arranges each secondary segment 41 at the setpoint height H1 above the highest point of the terrain that it overflies, i.e. the point of the overflown terrain that has the greatest altitude. Depending on the topology of the terrain, the secondary segments 41 of a given main segment 40 are disposed at altitudes that differ from one to another.

Figure 2:
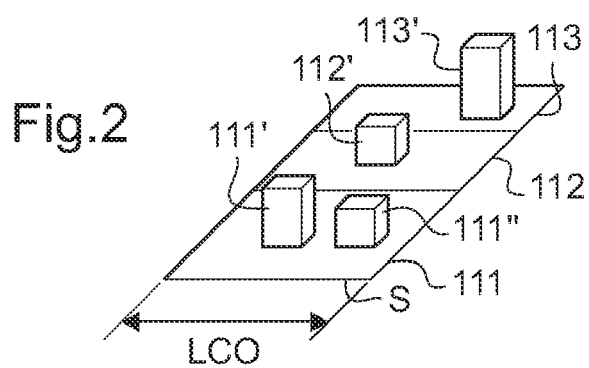
FIG. 2 is a diagram explaining the notion of segment corridor width.

With reference to FIG. 2, the computer 3 uses the database 1 to obtain information about the terrain S, and takes account of the given laying width LC0.

By way of example, three secondary segments need to be positioned over three distinct portions 111, 112, and 113 of the terrain S. Thus:
- a first secondary segment is positioned at the setpoint height H1 above the highest point 111' of the first portion 111, i.e. the point of the first portion 111 that has the greatest altitude;
- a second secondary segment is positioned at the setpoint height H1 above the highest point 112' of the second portion 112, i.e. the point of the second portion 112 that has the greatest altitude; and
- a third secondary segment is positioned at the setpoint height H1 above the highest point 113' of the third portion 113, i.e. the point of the third portion 113 that has the greatest altitude.

Since the computer 3 takes account of the laying width LC0, it can be seen that it is not essential for the highest terrain points that are taken into consideration to be in alignment.

With reference to FIG. 1, the secondary segments 41 are thus:
- distributed longitudinally along a main segment 40 going from a first secondary segment 42, starting at the first waypoint B via which the aircraft is to pass, towards a last secondary segment 43 going up to the second waypoint C of the associated main segment;
- disposed vertically at a setpoint height H1 above the terrain S; and
- horizontal and parallel to the given reference level LV0, e.g. sea level, in a given frame of reference and considering that the sea is contained in a plane.

In order to construct the framework 10, the computer 3 of the computer means 2 connects together any two adjacent segments that are located at distinct altitudes by means of a vertical bar, it being understood that two adjacent secondary segments that are at the same altitude are in alignment.

Thus, during an initial stage, the computer means 2 automatically constructs a framework 10 provided with a succession of levels that match the shape of the terrain S as closely as possible, at some low setpoint height H1 above the terrain.

It should be observed that the above-described first stage may naturally be performed for each main segment. Furthermore, it is conceivable that different parameters are used from one main segment to another, i.e. different setpoint heights, corridor widths, setpoint lengths, setpoint durations, or indeed setpoint indicated air speeds.

In order to subdivide the main segment into a plurality of secondary segments, a setpoint secondary length L0, that must be reached by the secondary length L1 of each secondary segment, is defined.

In a first implementation, the operator uses the input means 9 to determine the setpoint secondary length L0, e.g. in meters, for the secondary segments 41.

In a second implementation, the operator uses the input means 9 to determine a setpoint duration D0 and a setpoint indicated air speed IAS0. The computer means 2 then deduce a setpoint length L0 for the secondary segments that is equal to the product of the setpoint duration D0 multiplied by a setpoint ground speed Vs that is calculated from the setpoint indicated air speed IAS0 and the wind that is blowing outside the aircraft, i.e.:

$$L0 = D0*(Vs)$$

where "*" represents the multiplication sign.

Independently of the implementation, this setpoint length L0 is stored in the memory 3' of the computer means 2.

The computer means 2 is then in a position to partition the main segment in question.

Furthermore, since a setpoint secondary length L0 that must be reached by each of the secondary segments 41 has now been determined, the computer 3 of the computer means 2 determines the main length L1 of the main segment and then performs Euclidean division of said main length L1 of the main segment by the determined setpoint secondary length L0, with this Euclidean division giving a quotient Q and a remainder R.

If the remainder is zero, then during the first stage the computer means 2 subdivides the main segment into a number of secondary segments that is equal to the quotient, the secondary segments then all having a secondary length L2 equal to the setpoint secondary L0.

However, if the remainder is not zero, such subdivision is not possible. The computer means 2 then subdivide the main segment firstly into secondary segments having the setpoint secondary length L0, the number of these secondary segments being equal to the quotient of the Euclidean division performed minus one, and secondly into one lengthened secondary segment of lengthened secondary length L3 equal to the sum of the setpoint secondary length L0 plus the remainder R, i.e.:

$$L3 = L0 + R$$

where:
Q represents the quotient of the Euclidean division;
"+" represents the addition sign; and
R represents the remainder of the Euclidean division.

The computer means 2 then decides to lengthen the first secondary segment of the main segment in question.

Furthermore, the computer means 2 determine the altitude of each secondary segment relative to the given reference level LV0, and stores this altitude in its memory 3'.

Consequently, the computer means 2 construct the framework 10 with the help of one lengthened secondary segment and a number Q minus one of secondary segments each having a secondary length L2 equal to the setpoint secondary length L0, two adjacent secondary segments being in alignment if they are at the same altitude, and otherwise being connected together by a vertical bar.

Figure 3:
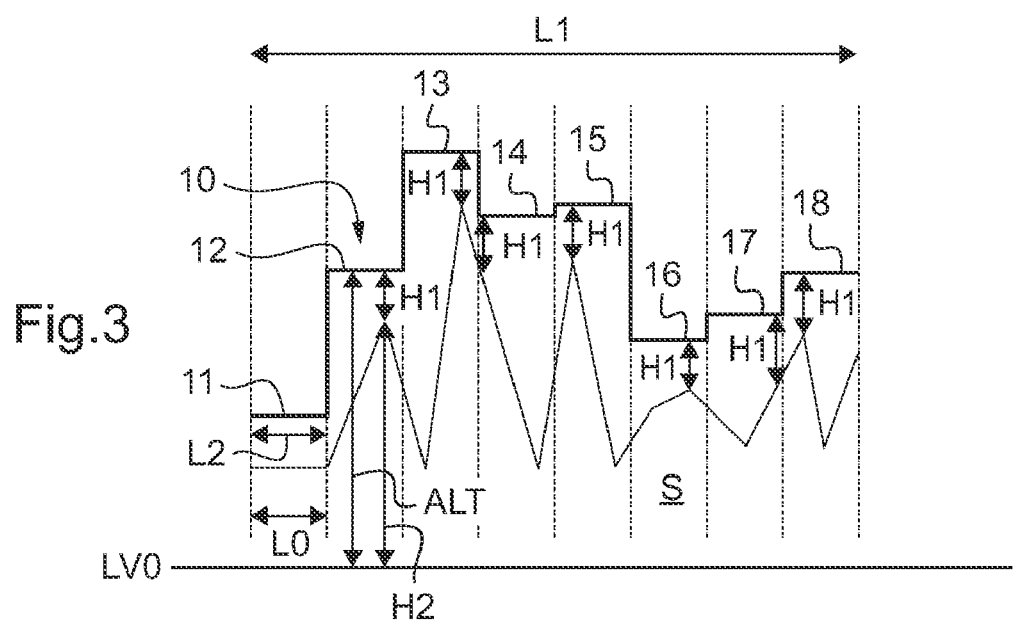
FIGS. 3 and 4 are diagrams explaining the minimization of secondary segments.
Figure 4:
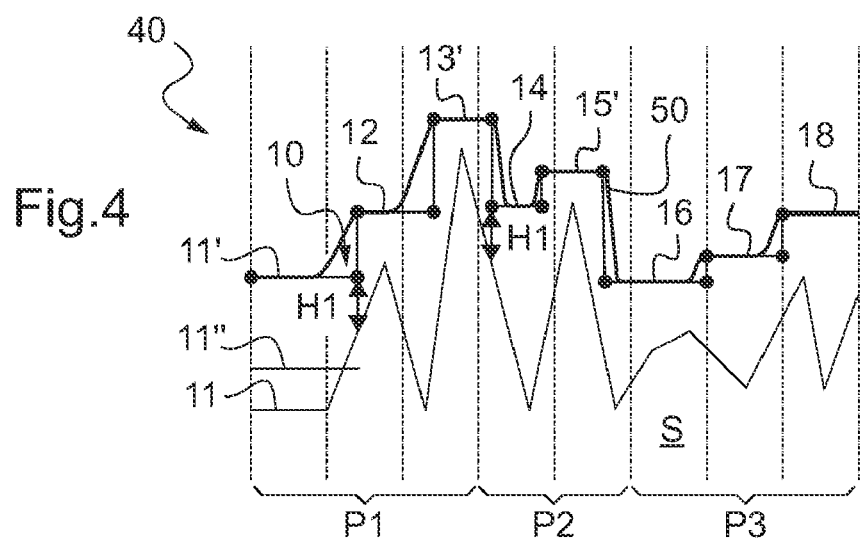

With reference to FIGS. 3 and 4, which show a framework that is different from the framework shown in FIG. 1, during the first stage, an operator may decide to optimize the framework 10 by limiting the secondary length of the secondary segments that are situated at the greatest altitudes ALT relative to the given reference level as selected by the operator.

Thus, an operator uses the input means 9 to specify a given number N of secondary segments that are to be minimized, for example the given number N may be equal to 2.

The computer 3 of the computer means then minimizes the secondary length of a given number N of secondary segments, starting from the secondary segment having the greatest altitude ALT and continuing in decreasing order.

Under such circumstances, with the altitude of each secondary segment 11 to 18 being previously determined and stored, the computer 3 minimizes the secondary length of the third secondary segment 13 to obtain a minimized third secondary segment 13' of minimized length, and then minimizes the secondary length of the fifth secondary segment 15 to obtain a minimized fifth secondary segment 15' having said minimized length, taking care to center the minimized secondary segments 13' and 15' of altitude greater than their two adjacent segments about the highest points they overlie so as to obtain minimized secondary segments that are centered.

The minimized third secondary segment 13' at an altitude that is greater than the altitude of the two secondary segments adjacent thereto, i.e. the second and fourth secondary segments, and the minimized third secondary segment 13' is centered about the highest point of the terrain that it overlies in order to obtain a minimized third secondary segment 13' that is centered.

Similarly, the minimized fifth secondary segment 15' is centered so as to obtain a centered and minimized fifth secondary segment 15'.

In contrast, it will be understood that a minimized secondary segment is not centered if its altitude is not greater than the altitudes of the secondary segments directly adjacent thereto, i.e. the preceding secondary segment and the following secondary segment, where appropriate. Such a situation, not shown in the figures, may occur if the minimized secondary segments are consecutive.

In a first implementation, the minimized length is given directly by an operator in the form of a length. In contrast, in the second implementation, the operator gives a minimized flying duration, which is transformed automatically into a minimized length by being multiplied by the setpoint ground speed calculated from the setpoint indicated air speed IAS0 and the existing wind.

Under such circumstances, it is not possible to connect the minimized secondary segments to their adjacent segments by means of a vertical bar.

Thereafter, the computer 3 modifies and/or moves certain secondary segments so as to obtain a framework 10 that is continuous.

Since the main segment 40 in question includes at least a first portion P1 going from the first secondary segment 11 to the centered and minimized third secondary segment 13', and a second portion P3 going from the centered and minimized fifth secondary segment 15' to the last secondary segment 18, and in the present example also an intermediate portion P2 between the centered and minimized third and fifth secondary segments 13' and 15', the following steps are performed in each of the portions P1, P2, P3:

starting from the centered and minimized secondary segment(s), the adjacent secondary segments, whether minimized or not, are moved in succession in order to reconstitute the framework 10; and then on reaching the secondary segment that has the lowest altitude in said portion, said secondary segment of lowest altitude is modified by increasing or reducing its secondary length L2 so as to obtain a modified secondary segment suitable for being connected to at least one adjacent secondary segment by means of a vertical bar.

Furthermore, if a movement, a reduction, or a lengthening of a secondary segment gives rise to a reduction or an increase in the height between said secondary segment and the terrain S, then the secondary segment is moved vertically to said setpoint height H1 above the highest point in the terrain it overlies.

In the example shown, in the first portion P1, the secondary segments that are adjacent to the centered and minimized third secondary segment 13' are moved. The movement of said secondary segments is stopped when it is necessary to handle the secondary segment of the first portion that is at the lowest altitude.

Thus, the computer 3 initially handles the secondary segment 12 that is adjacent to the centered and minimized first secondary segment. The computer 3 thus moves the second secondary segment 12 so as to connect it to the centered and minimized third secondary segment 13' by means of a vertical bar.

The computer 3 then handles the first secondary segment 11. This first secondary segment 11 represents the secondary segment at the lowest altitude in the first portion P1 relative to the given reference level, so the computer 3 modifies it by lengthening it so as to enable it to be connected to the second secondary segment 12.

Nevertheless, such a lengthened first secondary segment 11" leads to interference with the terrain S. Consequently, the computer 3 moves the new first secondary segment vertically so as to place it at the setpoint height H1 above the terrain S.

It should be observed that it is advantageous to use secondary segments having a secondary length L2 lying between a given minimum secondary length LMIN and a given maximum secondary length LMAX, with the minimum secondary length LMIN being for example set by an operator, whereas the maximum secondary length is possibly equal to the setpoint length L0 plus said minimum secondary length LMIN:

$$LMAX = LMIN + L0$$

Naturally, it is possible to allow an operator to set a value for the maximum secondary length.

Consequently, if the secondary length of a secondary segment becomes greater than or equal to the given maximum secondary length, then the computer means 2 subdivides the secondary segment in question into two secondary segments of identical size. Conversely, if the secondary length of the secondary segment becomes less than or equal to the minimum secondary length, then the secondary segment in question is eliminated and the adjacent secondary segment having the lower altitude is lengthened to compensate.

Thus, if the secondary length of the modified first secondary segment is greater than or equal to the maximum secondary length, then the computer 3 of the computer means 2 splits this first secondary segment.

In the second portion P2, the computer 3 of the computer means analyzes the fourth secondary segment 14. Since this fourth secondary segment 14 is the secondary segment in the second portion P2 that has the lowest altitude, the computer reduces its secondary length in order to connect it via vertical bars to the third and fifth segments that have been centered and minimized.

In addition, the computer moves the fourth segment vertically downwards in order to place it at the setpoint height H1 above the terrain S.

It should be observed that if the secondary length of the modified fourth secondary segment 14 were to become shorter than or equal to the minimum secondary length, then the computer 3 of the computer means 2 would combine the fourth secondary segment 14 with the adjacent secondary segment having the lower altitude, i.e. the fifth secondary segment that has been centered and minimized.

Finally, in the third portion P3, minimizing and centering the fifth secondary segment 15 gives rise to the sixth secondary segment 16 being lengthened.

With reference to FIGS. 5 to 7, there can be seen a framework that is different from the framework shown in FIGS. 1, 3, and 4, and at the end of the first stage but before the second stage of the method, the framework 10 is optimized by minimizing the value of the following expression E:

$$E = \int_{ti}^{tf} tdcp(x)\,dx - \int_{ti}^{tf} Zt(x)\,dx$$

where:
x is the curvilinear abscissa of the setpoint flight path;
tdcp(x) is the function describing the framework 10 as determined during the first stage;
Zt(x) represents the height (H2) above the overflown terrain S;
ti is the beginning of the first secondary segment of the main segment in question; and tf is the end of the last secondary segment of the main segment in question.

The expression E then represents the area of the shaded zones in FIGS. 5 to 7.

Initially, the computer 3 of the computer means 2 determines the value of the expression E on the basis of the framework that was obtained during the first stage, and then stores this value in the memory 3' of the computer means 2.

Thereafter, the computer 3 of the computer means 2 moves the original framework as determined during the first stage longitudinally through a given stepsize and in iterative manner over a given distance, and recalculates the value of the expression E at each step.

More precisely, with reference to FIG. 6, the computer means moves the framework to the left through one step of given size, optionally equal to the stepsize with which the digital model of the terrain is quantized.

Moving the framework to the left gives rise to:
a vertical upward movement of the seventh secondary segment 37 in order to ensure that this seventh secondary segment 37 remains at the setpoint height H1 above the terrain S;
a downward vertical movement of the fifth secondary segment 35 so that this fifth secondary segment 35 is at the setpoint height H1 above the terrain S; and
a lengthening of the ninth secondary segment 39 and a shortening of the first secondary segment 31.

The computer means 2 determine the value of the expression E and then store it in the memory 3'.

The computer means 2 then repeat these operations until the total movement to the left reaches a given distance, e.g. equal to half the secondary length of the shortest secondary segment.

With reference to FIG. 7, the computer means 2 perform the same operations, but moving the framework to the right.

Following the intermediate stage and during the second stage, the computer means 2 make use of the framework that gives rise to the smallest value for the expression E in order to generate the flight path to be followed.

An operator then uses the input means 9 to set the setpoint climb rate and descent rate. The computer means deduces therefrom the climbing and descent slopes of the setpoint flight path 50 to be followed by the pilot, or to be followed by an autopilot, for example.

With reference to FIG. 4, the computer means 2 generate the setpoint flight path 50 from the high segments 13', 15', and 18, with the setpoint flight path 50 being plane along the secondary segments it encounters and having slopes determined by the climb and descent rate in the other zones.

Between climbing flight and level flight, or between descending flight and level flight, the setpoint flight path 50 as generated takes account of the capacities of the aircraft, in particular its weight and its power.

In accordance with the example shown in FIG. 8, the setpoint flight path 50 tends to be plane between two distinct secondary segments.

Consequently, if during the second stage the setpoint flight path 50 as constructed does not make it possible to fly steadily over a first batch of consecutive secondary segments 25, 26 by generating a continuously rising curve 51, then the flight path tends to be jerky, the first batch having at least one secondary segment.

In order to smooth this setpoint flight path, with reference to FIG. 9, the computer means 2 modify the framework 10 so as to construct a single fused secondary segment by fusing said first batch and the secondary segment preceding said first batch, i.e. the secondary segment along which the aircraft travels prior to traveling along the secondary segment(s) of the first batch.

Thus, the computer means 2 modify the framework 10 by fusing the two consecutive secondary segments 25, 26 of the first batch with the secondary segment 24 preceding said first batch in order to construct a fused secondary segment 24' which is given the altitude of the preceding secondary segment 24.

In order to avoid disturbing the pilot by displaying a framework that impacts the terrain S, the display for the pilot shows the framework as previously determined at the beginning of the second stage and not the framework as transformed during the second stage.

Likewise with reference to FIGS. 10 and 11, if during the second stage the setpoint flight path 50 as constructed does not make it possible to fly steadily over a second batch of consecutive secondary segments 26, 27, 28, with a continuously descending curve being generated, then the flight path tends to be jerky since the second batch has at least one secondary segment.

In order to smooth this setpoint flight path 50, the computer means 2 modify the framework 10 to construct a single fused secondary segment by fusing said second batch with the secondary segment followed said second batch, i.e. the secondary segment along which the aircraft travels after it has traveled along the secondary segment(s) of the second batch.

Thus, the computer means 2 modify the framework 10 by fusing the three consecutive secondary segments 26, 27, 28 of the second batch with the secondary segment 29 following the second batch in order to construct a fused secondary segment 29', which is given the altitude of the following secondary segment 29.

It should be observed that a fused secondary segment is constructed if said at least one secondary segment of the first batch generates a continuously rising curve that does not include the first secondary segment of the main segment in question, or if said at least one secondary segment of the second batch generates a continuously descending curve that does not include the last secondary segment of the main segment in question.

Thus, on the ground or in flight, the method of the invention, advantageously implemented by the unit 100, serves automatically to establish a setpoint flight path that follows the terrain at low altitude.

Furthermore, once the information required for its operation is stored in the memory 3', the computer means can recalculate the setpoint flight path automatically.

For example, if the pilot moves the waypoint C, e.g. because of weather conditions, the computer means 2 automatically determine a framework suitable for passing through the new position of this waypoint C, together with the associated flight path.

Furthermore, FIG. 12 shows display means displaying two main segments 40 and an aircraft 60 on a horizontal projection of the terrain.

The aircraft 60 is extended by a rectilinear segment 61 referred to for convenience as the "return feeler".

It can be seen that the aircraft 60 is no longer following a main segment 40 and as a result is in so-called "free" flight.

However, with reference to FIG. 13, when the rectilinear segment 61 crosses a main segment 40 once more, and on instructions from an operator, the computer means 2 create a return main segment 80 that it automatically subdivides into a plurality of return secondary segments so that a return framework follows the terrain S as closely as possible and gives rise to a return flight path.

Naturally, the present invention is capable of being subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of assisting the piloting of an aircraft at low altitude over terrain, in which method via a machine, during a first stage, a framework is constructed from at least one main segment of given corridor width that extends in a horizontal projection over a model of said terrain between successive first and second waypoints determined by an operator, and then during a second stage, a setpoint flight path is constructed with the help of said framework, wherein during the first stage, said main segment is automatically subdivided into a plurality of secondary segments of given corridor width so that the framework follows said terrain as closely as possible, said secondary segments going from a first secondary segment starting from said first waypoint to a last secondary segment terminating at the second waypoint, each secondary segment being arranged at a setpoint height above the highest point of the terrain that it overlies, said setpoint height is identical for all of the secondary segments of a main segment, with any two adjacent secondary segments that are not in alignment being connected together by a vertical bar in a vertical section of said terrain and containing said main segment, wherein for a setpoint secondary length to be reached by the secondary segments that has been determined, and for Euclidean division of a main length of the main segment by the setpoint secondary length giving a quotient and a remainder:

if said remainder is zero, then during the first stage, the main segment is subdivided into a number of secondary segments all having a real secondary length equal to said setpoint secondary length, the number of secondary segments being equal to the quotient; and if said remainder is not equal to zero, then during the first stage, the main segment is subdivided firstly into a number of secondary segments all having the setpoint secondary length, that number being equal to said quotient minus one, and secondly into a lengthened secondary segment having a lengthened secondary length equal to the sum of the setpoint secondary length plus the remainder, said lengthened secondary segment being the first secondary segment of the main segment.

2. A method according to claim 1, said setpoint secondary length being determined by an operator.

3. A method according to claim 1, wherein, for an operator defining both a setpoint duration for traveling along a secondary segment and a setpoint indicated air speed, said setpoint secondary length is determined by multiplying said setpoint duration by a ground speed as calculated from said setpoint indicated air speed and the existing wind.

4. A method according to claim 1, wherein, if during the second stage the constructed setpoint flight path does not make it possible to pass level over at least one secondary segment and gives rise to a continuously rising curve, then the framework is modified by fusing said at least one secondary segment with the secondary segment preceding said at least one secondary segment in order to construct a fused secondary segment which is given the altitude of said preceding secondary segment.

5. A method according to claim 4, said fused secondary segment being constructed if said at least one secondary segment generating a continuously rising curve does not include said first secondary segment or if said at least one secondary segment generating a continuously descending curve does not include said last secondary segment.

6. A method according to claim 1, wherein, if during the second stage the constructed setpoint flight path does not make it possible to pass level over at least one secondary segment and gives rise to a continuously descending curve, then the framework is modified by fusing said at least one secondary segment with the secondary segment following said at least one secondary segment in order to construct a fused secondary segment which is given the altitude of said following secondary segment.

7. A method according to claim 1, wherein, for display means presenting said main segment and presenting said aircraft extended by a rectilinear segment, if the aircraft is no longer following a main segment, when the rectilinear segment crosses a main segment once more, and on instruction from an operator, a return main segment is created that is subdivided automatically into a plurality of return secondary segments so that a return framework follows said terrain as closely as possible and gives rise to a return flight path.

8. A method of assisting the piloting of an aircraft at low altitude over terrain, in which method via a machine, during a first stage, a framework is constructed from at least one main segment of given corridor width that extends in a horizontal projection over a model of said terrain between successive first and second waypoints determined by an operator, and then during a second stage, a setpoint flight path is constructed with the help of said framework, wherein during the first stage, said main segment is automatically subdivided into a plurality of secondary segments of given corridor width so that the framework follows said terrain as closely as possible, said secondary segments going from a first secondary segment starting from said first waypoint to a last secondary segment terminating at the second wavpoint, each secondary segment being arranged at a setpoint height above the highest point of the terrain that it overlies, said setpoint height is identical for all of the secondary segments of a main segment, with any two adjacent secondary segments that are not in alignment being connected together by a vertical bar in a vertical section of said terrain and containing said main segment wherein, during the first stage, for an operator specifying a given number of secondary segments of secondary length that is to be minimized, the altitude of each secondary segment is determined relative to a given reference level, and:

the secondary length of said given number of secondary segments is minimized to a given minimum length starting from the secondary segment having the greatest altitude and continuing in order of decreasing altitude in order to obtain said given number of minimized secondary segments;

each minimized secondary segment of altitude greater than the secondary segments adjacent thereto is centered so as to obtain a minimized secondary segment that is centered about the highest point of the terrain underlying said centered and minimized secondary segment; and for said main segment including a first portion going from the first secondary segment to a centered and minimized secondary segment, for a second portion going from a centered and minimized secondary segment to the last secondary segment, and eventually for at least one intermediate portion between two centered and minimized secondary segments, the following steps are performed in each of said portions:

starting from each centered and minimized secondary segment, the adjacent secondary segments are moved longitudinally to reconstitute the framework; and then on reaching the secondary segments of said portion that has the lowest altitude, the lowest-altitude secondary segment is modified by lengthening or shortening its secondary length so as to obtain a modified secondary segment suitable for being connected to at least one adjacent secondary segment by a vertical bar.

9. A method according to claim 8, the secondary length of said first and last secondary segments never being minimized.

10. A method according to claim 9, wherein during an intermediate stage between the first stage and the second stage, the framework is optimized by minimizing the value of the following expression (E):

$$E = \int_{ti}^{tf} tdcp(x)\,dx - \int_{ti}^{tf} Zt(x)\,dx$$

where:
x is the curvilinear abscissa of the setpoint flight path;
tdcp(x) represents the function describing the framework determined during the first stage;
Zt(x) represents the height of the overflown terrain (S);
ti represents the beginning of the first secondary segment; and
tf represents the end of the last secondary segment of the main segment.

11. A method according to claim 10, wherein, for said framework being moved longitudinally through a given step-size and in iterative manner over a given distance, with said value being recalculated on each step, the value of said expression is minimized during the second stage by using the framework that gave rise to a minimum value for said expression.

12. A method according to claim 8, wherein, if a movement, a shortening, or a lengthening of a secondary segment gives rise to a reduction or an increase in the height between the secondary segment and the terrain, then said secondary segment is moved vertically to said setpoint height above the highest point of the terrain that it overlies.

13. A method according to claim 8, wherein, for each secondary segment being required to have a secondary length lying between a given minimum secondary length and a given maximum secondary length, then:

if the secondary length of a secondary segment becomes greater than or equal to said given maximum secondary length, then said secondary segment in question is subdivided into two secondary segments of identical size; and if the secondary length of a secondary segment becomes shorter than or equal to said minimum secondary length, then said secondary segment in question is eliminated and the adjacent secondary segment having the lower altitude is lengthened to compensate.

14. A method of assisting the piloting of an aircraft at low altitude over terrain, in which method via a machine, during a first stage, a framework is constructed from at least one main segment of given corridor width that extends in a horizontal projection over a model of said terrain between successive first and second waypoints determined by an operator, and then during a second stage, a setpoint flight path is constructed with the help of said framework, wherein during the first stage, said main segment is automatically subdivided into a plurality of secondary segments of given corridor width so that the framework follows said terrain as closely as possible, said secondary segments going from a first secondary segment starting from said first waypoint to a last secondary segment terminating at the second waypoint, each secondary segment being arranged at a setpoint height above the highest point of the terrain that it overlies, said setpoint height is identical for all of the secondary segments of a main segment, with any two adjacent secondary segments that are not in alignment being connected together by a vertical bar in a vertical section of said terrain and containing said main segment, wherein, for a setpoint secondary length to be reached by the secondary segments that have been determined, said main segment is subdivided into a plurality of secondary segments if the length of said main segment is greater than twice said setpoint secondary length.

* * * * *